United States Patent
Cazenave

(10) Patent No.: US 11,778,947 B2
(45) Date of Patent: Oct. 10, 2023

(54) AUTOMATED ADJUSTABLE ANGLE OF INCIDENCE FAN FOR CLEANING SUGARCANE

(71) Applicant: DEERE & COMPANY, Moline, IL (US)

(72) Inventor: Blain J. Cazenave, Vacherie, LA (US)

(73) Assignee: DEERE & COMPANY, Moline, IL (US)

( * ) Notice: Subject to any disclaimer, the term of this patent is extended or adjusted under 35 U.S.C. 154(b) by 425 days.

(21) Appl. No.: 17/147,526

(22) Filed: Jan. 13, 2021

(65) Prior Publication Data

US 2022/0217908 A1 Jul. 14, 2022

(51) Int. Cl.
| | |
|---|---|
| *A01D 45/10* | (2006.01) |
| *F04D 19/00* | (2006.01) |
| *F04D 27/00* | (2006.01) |
| *A01F 12/44* | (2006.01) |

(52) U.S. Cl.
CPC ............ *A01D 45/10* (2013.01); *A01F 12/444* (2013.01); *F04D 19/002* (2013.01); *F04D 27/002* (2013.01)

(58) Field of Classification Search
CPC .... F04D 19/002; F04D 27/002; F04D 27/001; F04D 27/004; F04D 27/007; F04D 29/362; F05D 2270/80; A01D 45/10; A01D 43/077; A01D 43/085; A01F 12/444

See application file for complete search history.

(56) References Cited

U.S. PATENT DOCUMENTS

| | | | |
|---|---|---|---|
| 435,602 A * | 9/1890 | Doane | F04D 29/384 |
| | | | 416/214 R |
| 3,312,386 A * | 4/1967 | Hull | F04D 17/165 |
| | | | 415/214.1 |
| 3,482,690 A | 12/1969 | Noname | |
| 3,788,048 A | 1/1974 | Stiff et al. | |
| 3,830,046 A * | 8/1974 | Rollitt | A01D 45/10 |
| | | | 56/16.5 |

(Continued)

FOREIGN PATENT DOCUMENTS

| | | | | |
|---|---|---|---|---|
| CN | 105584626 A | * | 5/2016 | ............. B64C 11/40 |
| CN | 107806426 A | * | 3/2018 | ........... F04D 25/088 |

(Continued)

*Primary Examiner* — Arpad F Kovacs
(74) *Attorney, Agent, or Firm* — Taft Stettinius & Hollister LLP; Stephen F. Rost

(57) ABSTRACT

A sugarcane harvester for harvesting sugarcane including a cutter configured to cut sugarcane into a sugarcane mat. An extractor is operatively connected to the cutter, and includes a fan housing having an inlet configured to receive the sugarcane mat and an outlet configured to discharge crop debris. A fan is located in the fan housing to move the sugarcane mat through the fan housing and includes a motor, blades rotatably coupled to the motor, and a blade angle of incidence mechanism operatively connected to the blades, wherein the blade angle of incidence mechanism adjusts the angle of incidence of the blades with respect to the motor. Sensors identify an air flow through the fan housing or a load placed on the motor during movement of the sugarcane mat through the fan housing. The angle of incidence of the blades is adjusted based on one or both of the air flow through the fan housing or the load placed on the motor.

20 Claims, 8 Drawing Sheets

(56) References Cited

U.S. PATENT DOCUMENTS

| | | | | |
|---|---|---|---|---|
| 4,129,339 | A * | 12/1978 | Quick | A01D 45/10 |
| | | | | 406/165 |
| 4,155,602 | A * | 5/1979 | Quick | A01D 45/10 |
| | | | | 209/139.1 |
| 4,265,591 | A * | 5/1981 | Gurbin | F04D 29/36 |
| | | | | 416/214 R |
| 6,869,356 | B2 * | 3/2005 | Hinds | A01D 45/10 |
| | | | | 460/70 |
| 8,070,570 | B2 * | 12/2011 | Murray | A01D 41/1243 |
| | | | | 239/681 |
| 9,456,547 | B2 | 10/2016 | Cazenave et al. | |
| 10,344,993 | B2 * | 7/2019 | Gettig | F04D 29/601 |
| 11,419,266 | B2 * | 8/2022 | Linde | A01F 12/444 |
| 11,419,269 | B2 * | 8/2022 | Oubre, Jr. | A01D 43/08 |
| 2015/0342118 | A1 * | 12/2015 | Corbett | A01D 41/1274 |
| | | | | 73/114.25 |
| 2017/0251601 | A1 * | 9/2017 | Dugas | A01F 12/48 |
| 2019/0037770 | A1 * | 2/2019 | Dugas | A01F 12/444 |
| 2020/0137955 | A1 * | 5/2020 | Hansen | B07B 4/08 |
| 2021/0003141 | A1 * | 1/2021 | Haegele | F04D 29/362 |
| 2021/0016864 | A1 * | 1/2021 | McBain | B64C 11/34 |
| 2021/0227751 | A1 * | 7/2021 | Fattepur | A01D 45/10 |

FOREIGN PATENT DOCUMENTS

| | | | | |
|---|---|---|---|---|
| CN | 113602479 A | * | 11/2021 | B64C 11/44 |
| CN | 215409411 U | * | 1/2022 | F04D 29/32 |
| CN | 216035089 U | * | 3/2022 | B64C 11/44 |
| CN | 218368269 U | * | 1/2023 | B64C 11/44 |
| DE | 202009000716 U1 | * | 7/2009 | F04D 25/0613 |
| KR | 20110000928 U | * | 1/2011 | F04D 25/08 |

* cited by examiner

AUTOMATED ADJUSTABLE ANGLE OF INCIDENCE FAN FOR CLEANING SUGARCANE

FIELD OF THE DISCLOSURE

The present invention generally relates to a harvesting machine, and more particularly to a system and method for harvesting sugarcane with a sugarcane harvesting machine.

BACKGROUND

Agricultural equipment, such as a tractor or a self-propelled harvester, includes mechanical systems, electrical systems, hydraulic systems, and electro-hydraulic systems, configured to prepare fields for planting or to harvest crops.

Harvesters of various configurations, including sugarcane harvesters, have harvesting systems of various types. Harvesting systems for a sugarcane harvester, for example, include assemblies or devices for cutting, chopping, sorting, transporting, etc., and otherwise gathering and processing sugarcane plants. Typical harvesting assemblies, in different embodiments, include a base cutter assembly (or "base cutter"), feed rollers, cutting drums, stalk collectors, and extractor fans etc.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane stalks are discharged to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include rotating drums that move the cut stalks toward a chopper. The rotating drums are driven by a hydraulic motor or an electric motor that rotationally drives the roller to continuously move the billets to a fan for processing, and once processed, to the wagon or other container. The motors include splines that engage the roller to drive the roller about a rotation axis.

The sugarcane, once cut, forms what is known as a "mat" of sugarcane. The sugarcane harvester feeds the mat to a chopping section where it is chopped, including the stalk which is cut into segments. The sugarcane harvester advances the billets along with crop residue (e.g., leafy material, such as leaves, roots, and field debris etc.) to a primary extractor that separates at least a portion of the crop residue from the billets. The primary extractor includes a fan assembly having a motor and blades to clean the sugarcane, that is, to remove the crop residue from the sugarcane billets. The removed crop residue is discharged to the ground or to a collection wagon.

The primary extractor fan assembly is noted for consuming large amounts of power generated by the sugarcane harvester. For instance, currently known primary extractor fans include various inefficiencies that reduce the fans ability to efficiently use supplied power. Such inefficiencies can prevent the fan from operating efficiently under all field operating conditions. Cleaning of the sugarcane mat is highly load dependent, and is heavily affected by field conditions, such as crop density, crop moisture, and harvesting speeds, etc. These and other field conditions can affect throughput of billets through the cleaning chamber where the primary extractor fan assembly is located. Consequently, the amount of billets as determined by the number of tons per hour can change dramatically from field to field as well as within a field itself. Depending on the load being experienced by the primary extractor fan, the efficiency of the fan, which is dependent on fan speed and/or air flow, changes during cleaning of the incoming mat and therefore, so does the power consumption of the fan.

Depending on the efficiency of the primary extractor fan assembly, some billets are discharged at the output of the primary extractor instead of being moved to an elevator for discharge into a wagon or other container to be hauled away. In different embodiments, the sugarcane harvester includes a secondary extractor that separates crop residue from the billets and discharges the separated crop residue from the sugarcane harvester. The secondary extractor includes a fan assembly having a motor and blades to discharge the crop residue from the harvester to the ground or to a collection wagon. The discharged billets are typically lost and are known as "field losses." These losses add up over the harvesting season and the amount of losses, if weighed, can be in the tons. Such losses are basically money that is left in the field What is needed therefore is a sugarcane harvester including a primary extractor fan assembly that efficiently and effectively removes crop residue from the billets, without removing an excessive amount of billets.

SUMMARY

In one embodiment, there is provided a primary extractor for a crop harvester configured to harvest sugarcane including a frame having an inlet and an outlet, wherein the inlet is configured to receive a sugarcane mat and the outlet is configured to discharge cleaned sugarcane billets. A fan assembly is located at the primary extractor, and includes fan blades coupled to a rotary actuator that adjusts the angle of incidence of the fan blades, wherein the fan blades have an adjustable angle of incidence. An actuator adjustably controls the angle of incidence of the blade by controlled rotation of the blade at its connection to the rotary actuator. As described herein, the angle of incidence refers an angle of the blade with respect to the fan motor or the fan housing and does not refer to an inherent geometric pitch of the blade itself.

In another embodiment, there is provided a sugarcane harvester for harvesting sugarcane including a cutter configured to cut sugarcane into a sugarcane mat and a primary extractor disposed adjacent to the sugarcane mat configured to remove crop residue from the sugarcane mat. An elevator includes a conveyor to move the sugarcane mat to an end of the conveyor and a secondary extractor is operatively connected to the elevator. The primary extractor includes a fan assembly having adjustable angle of incidence blades which whose angles are adjustable with respect to the fan motor or fan housing to remove crop residue from the sugarcane mat.

In a further embodiment, there is provided a method of harvesting sugarcane from a field of sugarcane with a sugarcane harvester. The method includes: cutting sugarcane from the field to obtain a sugarcane mat of cut stalk and crop residue; delivering the cut stalk and the crop residue to a primary fan housing of the sugarcane harvester; providing an air flow of variably velocity through the primary fan housing with a fan having adjustably controlled angle of incidence blades to remove the crop residue from the sugarcane mat; and directing the cut stalk from the fan to an elevator for secondary extraction of crop residue from the cut stalk.

In an additional embodiment, there is provided a crop separator configured to process sugarcane including a housing having an inlet and an outlet, wherein the inlet is configured to receive a sugarcane mat, having crop debris and billets, and the outlet is configured to receive crop debris. A fan assembly is located in the housing, wherein the fan assembly includes a plurality of fan blades coupled to a spindle, a motor configured to rotate the plurality of fan blades about a rotational axis of the spindle, and a blade angle of incidence mechanism operatively connected to the plurality of blades, wherein the blade angle of incidence mechanism adjusts the angle of incidence of each of the plurality of blades. A controller is operatively connected to the motor and to the blade angle of incidence mechanism. The controller includes a processor and a memory, wherein the memory is configured to store program instructions and the processor is configured to execute the stored program instructions to: identify a rotational speed of the plurality of fan blades; identify an angle of incidence of one or more of the plurality of blades; and adjust the angle of incidence of the one or more of the plurality of blades based on the identified rotational speed of the motor.

In another embodiment, there is provided a sugarcane harvester for harvesting sugarcane. The harvester includes a cutter, configured to cut sugarcane into a sugarcane mat having crop debris and billets, and an extractor operatively connected to the cutter. The extractor includes a fan housing having an inlet configured to receive the sugarcane mat and the outlet configured to discharge crop debris from the sugarcane mat, and a fan located in the fan housing to move the sugarcane mat through the fan housing. The fan includes a motor, blades rotatably coupled to the motor, and a blade angle of incidence mechanism operatively connected to the blades, wherein the blade angle of incidence mechanism adjusts the angle of incidence of the blades with respect to the motor. An elevator is operatively connected to the extractor to discharge billets from the extractor. A fan speed sensor is operatively connected to the fan to identify a rotational speed of the blades. A motor load sensor is operatively connected to the fan to determine a load placed on the motor during movement of the sugarcane mat through the fan housing. A user interface, having user selectable controls, includes a fan airflow/power consumption selector. A controller is operatively connected to the user interface, the motor, and to the blade angle of incidence mechanism, the controller including a processor and a memory, wherein the memory is configured to store program instructions and the processor is configured to execute the stored program instructions to: identify a rotational speed of the blades; identify an angle of incidence of one or more of the blades; and adjust the angle of incidence of the one or more of the blades based on the identified rotational speed of the motor.

In a further embodiment, there is provided a method of harvesting sugarcane from a field of sugarcane with a sugarcane harvester. The method includes: cutting sugarcane from the field to obtain a sugarcane mat of cut stalk and crop residue; delivering the cut stalk and the crop residue to a fan housing of the sugarcane harvester, wherein the fan housing supports an adjustable speed fan having blades; providing an air flow through the fan housing with the adjustable speed fan to remove the crop residue from the sugarcane mat; determining the rotating speed of the adjustable speed fan; and adjusting an angle of incidence of the blades based on the determined rotating speed of the adjustable speed fan.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
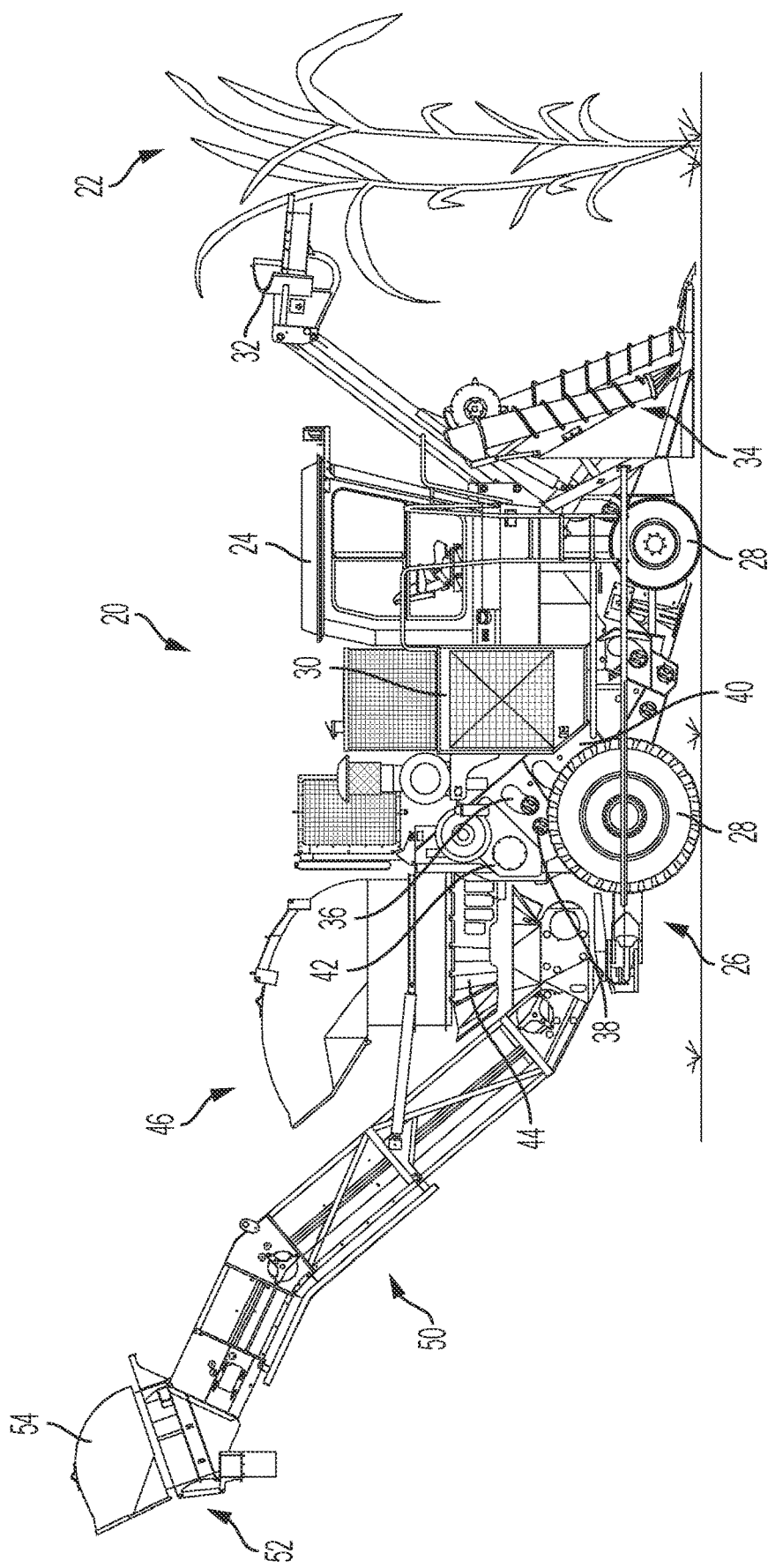
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants upwardly and rearward within the harvester 20 toward successive pairs of upper feed rollers 36 and lower feed rollers 38. The feed rollers 36 and 38 are supported by a feed roller chassis 40 which is supported by the main frame 26. The upper and lower feed rollers 36 and 38 convey the stalks toward a chopper drum module 42 for chopping the stalks into billets.

The chopper drum module 42 includes upper and lower chopper drums that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a fan assembly including a powered fan to clean the billets and to extract the crop residue, trash, and debris from the cleaning chamber 44. A loading elevator 50, with a one end located at the bottom of the cleaning zone 44, conveys the cleaned billets upward to a discharge location 52, below a secondary extractor 54, where the billets are discharged into a truck, a wagon, a container, or other receptacle that collects the discharged billets. The secondary extractor 54 separates the crop residue from the cut stalk to clean the cut stalk.

Figure 2:
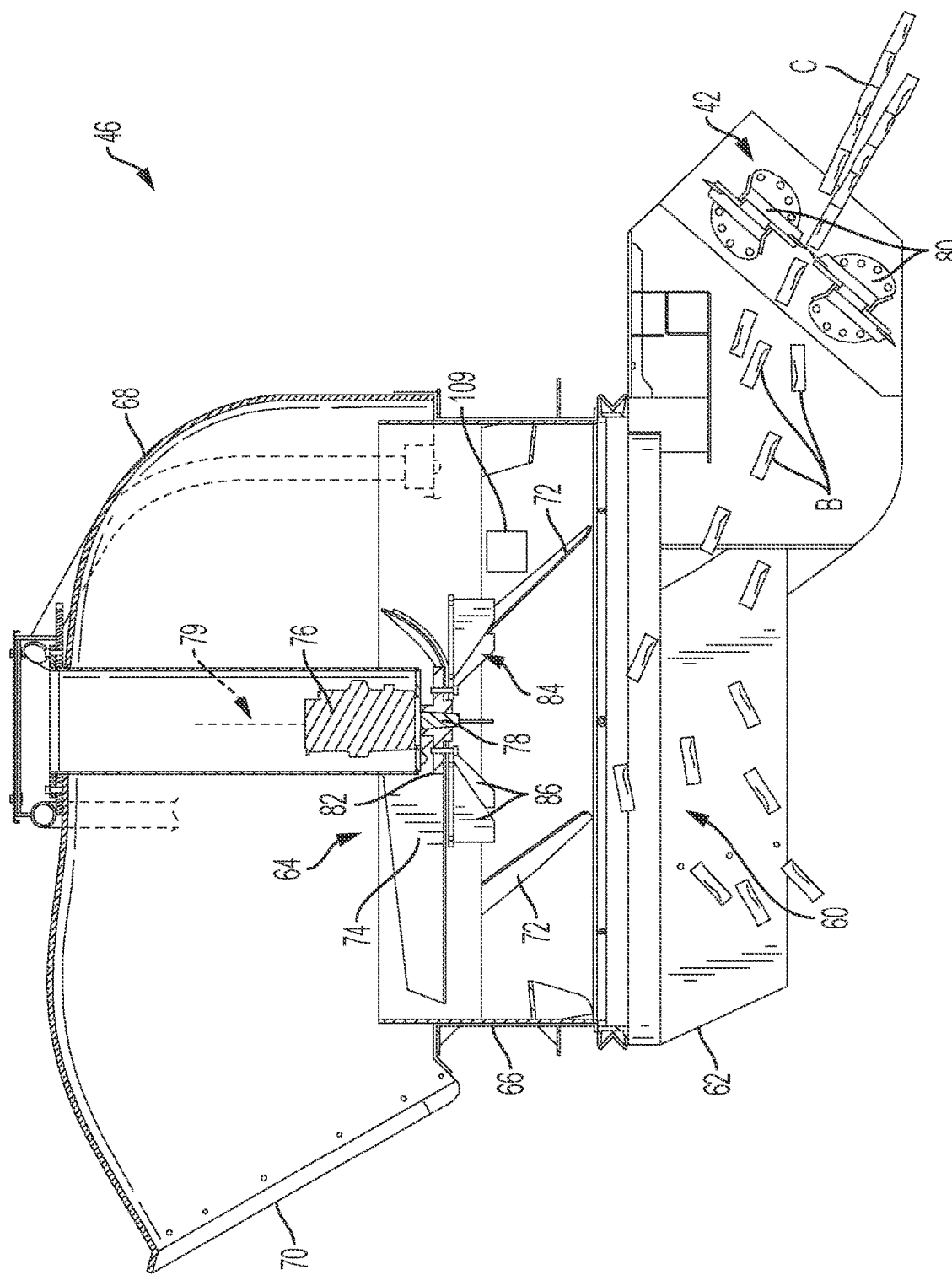
FIG. 2 illustrates a side sectional view of a primary extractor coupled to an elevator.

FIG. 2 illustrates a cross section through the chopper drum module 42 and the primary extractor 46. The chopper drum module 42 cuts the crop and the primary extractor 46 receives the cut crop from the chopper drum module 42 and generally separates the cut crop by way of a crop cleaner, which will be described in greater detail below. The crop cleaner may include any suitable mechanism for cleaning the cut crop, such as a fan (as in the illustrated construction that will be described below), a source of compressed air, a rake, a shaker, or any other mechanism that discriminates various types of crop parts by weight, size, shape, etc. in order to separate extraneous plant matter from billets. The primary extractor 46, in different embodiments, includes any combination of one or more of a cleaning chamber 60, a cleaning chamber housing 62, a crop cleaner such as a fan assembly 64, a fan enclosure 66, and a hood 68 having an opening 70. The fan enclosure 66 is coupled to the cleaning chamber housing 62 that in at least one embodiment includes deflector vanes 72. The fan assembly 64 includes a plurality of blades 74 driven by a fan motor 76 having a spindle 78 driving the fan blades 74. The angle of incidence of each of the fan blades 74 is adjustable relative an axis of rotation 79 (see FIG. 2) of the motor 76 that rotates the fan blades, which also defined by the housing 248 as further described with respect to FIGS. 5-8. The fan motor 76 that drives the fan blades about the axis of rotation 79 is not illustrated in FIG. 5. As described herein, the position of the fan blade with respect to the axis of rotation 79 of the fan motor 76 is an angle of incidence of the blades with respect to the incoming airstream. This is in contrast to the blade itself that has an inherent geometric pitch or "blade twist" which is identified from a hub of the blade to a tip of the blade. In one embodiment as described herein, an airfoil type fan blade is used. Other types of blades are contemplated. Consequently, the embodiments of the present disclosure include the use of different types of fan blades including but not limited to airfoil type blades (a variable pitch blade with a "twist"), variable radius blades, and constant radius blades. The angle of incidence is adjusted for all types of blades, regardless of the geometric pitch of the blade itself.

The chopper drum module 42 includes counter-rotating drum cutters 80 with overlapping blades for cutting the stalks of crop, such as cane C, into billets B, which are pieces of the stalk. In other constructions, the chopper drum module 42 includes any suitable blade or blades for cutting the stalks of crop. The crop also includes dirt, leaves, roots, and other plant matter, which will be collectively referred to herein as crop debris, which are also cut in the chopper drum module 42 along with the cane C. The chopper drum module 42 directs a stream of the cut crop (cut stalks, or billets B, and crop debris) to the cleaning chamber 60, which is generally defined by the cleaning chamber housing 62, the fan enclosure 66, and/or the hood 68.

The hood 68, coupled to the fan enclosure 66, includes a domed shape, or other suitable shape, and includes the opening 70 angled out from the harvester 20 and facing slightly down onto a field. In some constructions, the opening 70 is generally perpendicular to the driveshaft 78. The hood 68 directs cut crop through the opening 70 to the outside of the harvester 20, e.g., for discharging a portion of cut crop removed from the stream of cut crop back onto the field.

The fan assembly 64 is mounted in the cleaning chamber 60 to clean the sugarcane mat by separating the cut billets from the crop debris. In one embodiment, the fan assembly 64 is in the form of an extractor fan having axial flow fan blades 74 radiating out from, and joined to, a motor hub 82. In the illustrated construction, the fan assembly 64 is configured to draw air and extraneous plant matter from the cleaning chamber 60. In other embodiments, the fan assembly 64 is configured to blow rather than extract, i.e., to blow or push the air through the cleaning chamber 60 to clean the sugarcane mat by measuring leaf content and/or billet loss. The fan assembly 64, in different embodiments, includes other types of fans with other types of blades, such as a centrifugal fan, amongst others. In one or more embodiments, a centrifugal blower wheel 84 is mounted for rotation with the fan blades 74 and includes a plurality of generally right-angular blower blades 86 that are fixed to the underside of the centrifugal blower wheel 84 radiating out therefrom.

The motor 76, such as a hydraulic motor, includes the drive shaft 78 operatively coupled to the fan blades 74. For example, the drive shaft 78 may be keyed to the hub 82 or operatively coupled in other suitable ways to drive the fan blades 74. The motor 76, in other embodiments, is operatively coupled to drive the centrifugal blower wheel 84 in a similar manner. In other embodiments, the motor 76 is electric, pneumatic, or any other suitable type of motor, engine, or a prime mover, to drive the fan blades 74 and/or the centrifugal blower wheel 84.

Figure 3:
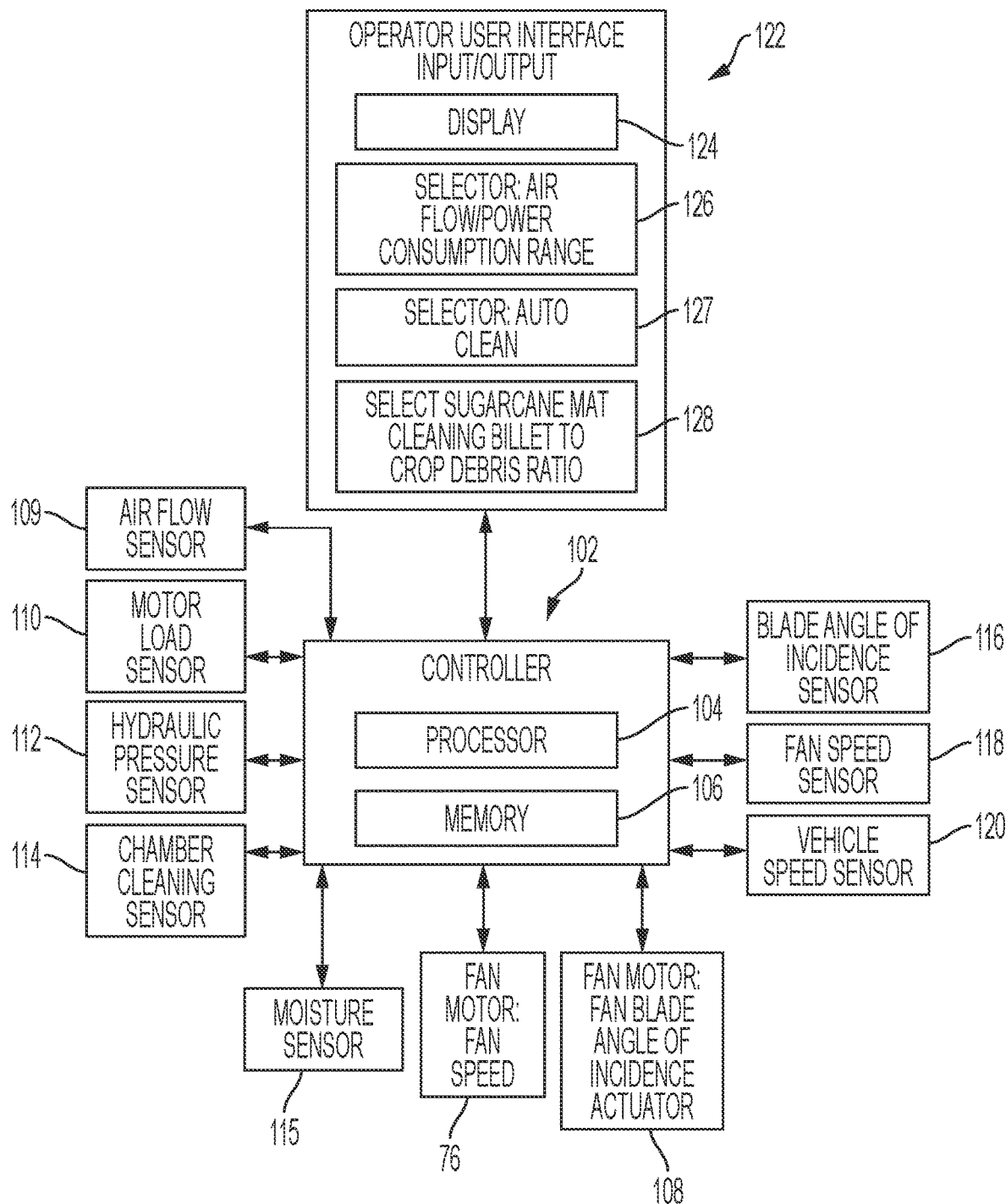
FIG. 3 illustrates a schematic block diagram of a control system of a work vehicle.

FIG. 3 illustrates a schematic block diagram of a control system 100 of the vehicle 20 configured to clean the sugarcane mat based on the composition of the mat that can include varying amounts of sugarcane billets and crop debris, such as leaf content. Each field of sugarcane can have different varieties of sugarcane, which not only varies in height, but also varies in stalk diameter, moisture content, and leafy material. Because the size, shape, and weight of the billets being cut from sugarcane can vary over a wide range, the control system 100 is configured to adapt to various field operating conditions with variable billet throughput. In one embodiment, the position of the fan blades with respect to the motor axis 79, or angle of incidence mechanism, is adjusted based on the amount of billets being separated from the incoming sugarcane mat based on fan loading and based on power consumption limits set by the user. The control system 100 determines fan loading and adjusts the fan speed and adjusts an angle of incidence of the blades with respect to the motor axis 79 to optimize billet separation and fan loading. For instance, in some instances there is a tradeoff between power consumption of the system versus an amount of extraneous matter/crop debris separated from the incoming sugarcane mat.

To increase the extraction of extraneous matter/crop debris from the incoming sugarcane mat, additional horsepower is required to operate the fan, which increases fuel costs, and increases fan loading. Higher fan speeds tend to clean the sugarcane mat more effectively, but more field losses occur at the higher speeds, which leads to higher power consumption. Consequently, there is a tradeoff between the amount of billet losses versus the amount of crop residue.

To optimize billet extraction and to reduce fuel consumptions, the control system 100 includes a controller 102, including a processor 104 and a memory 106, configured to optimize a rotational speed of the fan motor 76 of fan assembly 64 as well as to adjust the angle of incidence of fan blades 74. The angle of incidence is adjusted by a fan blade angle of incidence actuator, or mechanism, 108 of FIG. 3. For instance, see the motor 270 of FIG. 7. The actuator 108, i.e. the motor 270, shaft 268, and gear 266.

The ability to adjust the angle of incidence of the blades during crop harvesting and during fan operation while cleaning the crop mat enables the fan blades to perform within an intended optimal range of the angle of incidence of the fan blade to increase fan efficiency and air flow distribution throughout the cleaning chamber. The proposed operational range of cleaning efficiency balanced by billet loss is also influenced by and dependent on the blade geometry, the inherent blade pitch. Operating within the operational range increases fan efficiency and air flow distribution within the cleaning chamber. By improving air flow distribution in the cleaning chamber, more efficient residue extraction is achieved. As a result, power consumption is reduced which provides improved performance. Increasing fan efficiency by monitoring fan speed, adjusting fan speed, and adjusting blade angle of incidence within a predetermined operating range, improves performance, reduces fuel cost, increases residue extraction, and reduces billet losses. Being able to reduce fuel consumption while increasing fan performance and efficiency saves money by reducing fuel costs and reducing the amount of lost billets that are thrown out with the crop debris. Improved cleaning results and harvester performance is enhanced.

To achieve the desired extraction, the controller 102, in different embodiments, includes a computer, computer system, or other programmable devices. In these and other embodiments, the controller 102 includes one or more of the processors 104 (e.g. microprocessors). The associated memory 106 can be internal to the processor or external to the processor(s) 104. The memory 106 includes, in different embodiments, random access memory (RAM) devices comprising the memory storage of the controller 102, as well as any other types of memory, e.g., cache memories, non-volatile or backup memories, programmable memories, or flash memories, and read-only memories. In addition, the memory can include a memory storage physically located elsewhere from the processing devices, and can include any cache memory in a processing device, as well as any storage capacity used as a virtual memory, e.g., as stored on a mass storage device or another computer coupled to controller 102. The mass storage device, in different embodiments, includes a cache or other dataspace which can include databases. Memory storage, in other embodiments, is located in a cloud system, also known as the "cloud", where the memory is located in the "cloud" at a distant location from the machine to provide the stored information wirelessly to the controller 102. An antenna is operatively connected to a transceiver (not shown), which is operatively connected to the controller 102. When referring to the controller 102, the processor 104, and the memory 106, other types of controllers, processors, and memory are contemplated.

The controller 102 executes or otherwise relies upon computer software applications, components, programs, objects, modules, or data structures, etc. Software routines resident in the included memory 106 of the controller 102, or other memory, are executed in response to the signals received from a plurality of sensors, each of which provides a signal to the controller 102 that identifies a state of a device or structure of the vehicle 20. An air flow sensor 109 is located in the hood 68 to determine a flow of air through the hood 68 (See FIG. 2). In the illustrated embodiment, the air flow sensor 109 is located below the fan blades. Other locations are contemplated. A motor load sensor 110 identifies a load experienced by the motor 76 during cleaning of the sugarcane mat. In one or more embodiments, the motor load sensor 110 is a hydraulic pressure sensor that identifies motor loading of a hydraulic motor. Other types of motor load sensors are contemplated.

A chamber pressure sensor 112 identifies a hydraulic pressure of a hydraulic circuit that operates the motor 76, if it is a hydraulic motor. In one or more embodiments, the chamber pressure sensor is a manometer that measures atmospheric pressures within the chamber, which are used to operate the variable angle of incidence fan. If an electric motor is used, the current supplied to the motor is identified. A chamber cleansing sensor 114 identifies a cleaning extent of the sugarcane mat, i.e. which includes in different embodiments a measured leaf content and/or billet loss which results from excessive cleaning that does not sufficiently remove the debris. In one embodiment, a residue detector is used to adjust fan speed based on the amount of residue detected. In this embodiment, the cleanliness of the billets is determined, i.e. the amount of residue remaining in the cleaned billets. In one embodiment, the chamber cleaning sensor 114 includes a video camera or other vision technology to determine billet content in the sugarcane mat being cleaned. A moisture sensor 115 detects a moisture content of the sugarcane mat and includes, in one embodiment, an infrared sensor. Other moisture content sensors are contemplated. In an auto clean system, as described later herein, billet losses as well as crop residue are detected.

A blade angle of incidence sensor 116 provides an angle of incidence of the blade with respect to an axis of the drive shaft of 78. In one embodiment, the blade angle of incidence sensor 116 is an encoder that is configured to measure blade of incidence. Other types of blade angle of incidence sensors are contemplated. A fan speed sensor 118 is operatively coupled to the motor 76 to determine rotational fan speed. A vehicle speed sensor 120 is identifies the vehicle ground speed as the vehicle traverses the sugarcane field. The vehicle ground speed determines, at least in part, the rate at which the sugarcane is cut, and the rate at which the sugarcane moves through the upper and lower feed rollers 36 and 38 that convey the stalks toward the chopper drum module 42 to chop the stalks into billets. Vehicle speed sensors include, but are not limited to a speedometer, radar, and a velocimeter.

The controller 102, in one or more embodiments, also relies on one or more computer software applications, that are located in the memory 106, external memory located on the vehicle, or memory located in the "cloud", where the cloud generally refers to a network storing data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

A user interface 122 is configured to receive one or more inputs, typically provided by an operator, and to provide outputs to the controller 102, such as signals that provide operating instructions to the controller, or user outputs such as sound alerts or visuals displays, for instance. In one or more embodiments, display 124, provides visual displays or indicators of vehicle status, vehicle operating status or conditions. A selector 126 enables an operator to select an air flow provided by the fan motor 76 and to select a power consumption consumed by the fan motor 76. Both the air flow and the power consumption include a range of values to be described with respect to Table 1 as described herein. The selector 126 includes a plurality of air flow settings each of which can be selected by the operator to select a fan speed that provides a desired extraction of extraneous matter, including leafy trash, roots, dirt, rocks, from the sugarcane mat. The selector also includes a plurality of power consumption settings that provides a power setting at which the fan motor operates. Once the air flow and power consumption are selected that match the user inputs, the controller determines a preferred angle of incidence of the blade and an airflow to meet the selected parameters of power consumption. Either one of or both of the air flow and power consumption are changeable by the operator throughout the harvest to adapt to different crop conditions. In another embodiment, a desired extraction level of extracting extraneous matter is selected. Once selected, the controller determines the preferred angle of incidence of the blade. A select auto clean operator input 127 is set by the operator to select an auto-clean function which automatically cleans the sugarcane mat based on a cleaning load and/or the cleanliness of the sugarcane mat experienced by the fan motor 76 during cleaning. In an auto clean mode, the speed of motor is automatically set during cleaning to achieve a desired cleaning. Please see U.S. Pat. No. 10,091,934, incorporated herein by reference, for one type of automatic cleaning system that is utilized upon selection of the auto clean operator input 127.

Additionally, a billet to crop debris ratio selector 128 is provided for the operator to select from a number of billet to crop debris ratios. In one embodiment, the selector 128 includes two or more selector buttons, each of which includes a different ratio which the operator can select. For instance, in one embodiment, one selector is for a ratio of 90% billet to 10% crop debris. A second selector in this embodiment is for a ratio of 85% billet to 15% crop debris. In another embodiment, the selector is slider selector having a range of selections that are selected by a slider. In different embodiments, the user interface 122 includes manually selectable buttons, a touch screen buttons, such as capacitive touch buttons or infrared touch buttons. Other types of selectors are contemplated.

Figure 4:
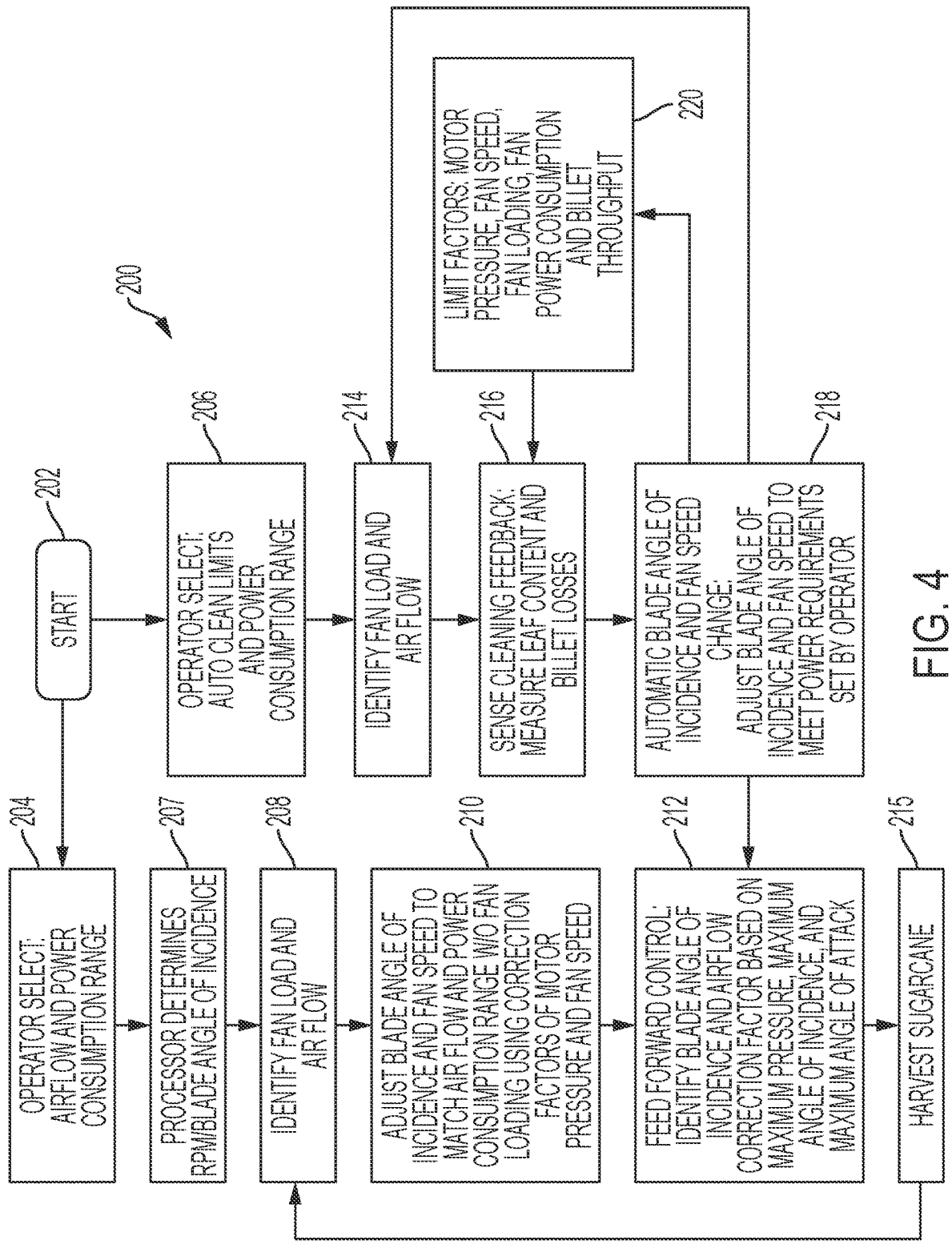
FIG. 4 shows a block flow diagram of a process for a sugarcane cleaning operations.

FIG. 4 shows a block diagram of a process for a cleaning operation of the sugarcane harvester 20. Upon starting of the vehicle 20 at start operation 202, the operator selects from one of two cleaning operations. In one operation, the operator selects a manual mode at block 204. In a second operation, the operator selects an auto clean operation at block 206, that works in tandem with operator selected values of air flow and power consumption.

At block 204, the operator selects an air flow and a power consumption using the selector 126. In the alternative, at block 206, the operator selects the auto clean selector 127 to select auto clean limits and a power consumption range. If the operator selects a manual control of air flow and power range at block 204, the processor determines a revolutions per minute (RPM) and blade angle of incidence at block 207. In one embodiment, the operator selects air flow and power consumption based on experience by knowing the travel speed of the vehicle and the size and condition of sugarcane in the field. In another embodiment, the operator harvests a sample of sugarcane and observes the billet content and crop debris content being ejected from the harvester 20. Upon noting the condition of the sample, the operator selects an appropriate fan speed to achieve a desired billet output a desired trash output or a desired billet loss level, from the sugarcane mat.

Once the airflow and/or power consumption range is selected, the controller 102 identifies the selected air flow using the air flow sensor 109 and identifies a fan load using the motor load sensor 110 at block 208. This identification is made during the harvest operation and is continuously adjusted at block 210. At block 210 the processor 102 adjusts the blade angle of incidence and fan speed to match the air flow and a power range without fan loading using correction factors of motor pressure and fan speed. In one or more embodiments, the fan loading is monitored at all times and the fan speed is adjusted continuously based on the monitored fan loading.

In some instance, the operator adjusts the power consumption operating range, if not satisfied with the fan performance within the pre-set operating range. In this case, the power consumption range is adjusted to allow more extractor fan power consumption to achieve a desired extraneous extraction level.

The identified air flow is compared to the selected air flow and the identified power consumption is compared to the selected power consumption during operation. The angle of incidence of the fan blades 74 is adjusted based on correction factors that are stored in the memory 106, in a lookup table for instance. In one example as seen in Table 1 that follows, if the air flow is set to a range of 30,000 to 32,460 CFM and a machine feed rate is at 40-52 tons/hour, angle of incidence, appropriate for the selected airflow is an angle of incidence having a range of 12-25 degrees of incidence. At this airflow, the fan rpm is set to a value of between 600 to 1000 revolutions per minute. At this setting, the angle of attack is limited to less than 10 degrees as seen in Table 1.

As described herein, the angle of attack is a calculated value based the angle between the incoming airstream and the blade chord line. The blade chord line is the imaginary line from leading edge to the trailing edge. The angle of attack changes when the fan RPM and Blade Pitch are changed.

TABLE 1

| Optimal Airflow (CFM) | Machine Feed Rate (tons/hour) | Power Consumption @ Max Hydraulic Pressure (HP) | Angle of Incidence (degrees) | FAN RPM | Angle of Attack Limit (degrees) | Crop Cleaning/Billet Loss Levels |
|---|---|---|---|---|---|---|
| 30,000-32,460 | 40-52 | OPERATOR SET POINT PER HARVESTING PRACTICE | 12-25 | 600-1000 | <10 | OPERATOR SET POINT/MANUALLY MONITOR |

TABLE 1-continued

| Optimal Airflow (CFM) | Machine Feed Rate (tons/hour) | Power Consumption @ Max Hydraulic Pressure (HP) | Angle of Incidence (degrees) | FAN RPM | Angle of Attack Limit (degrees) | Crop Cleaning/Billet Loss Levels |
|---|---|---|---|---|---|---|
| 32,460-34,920 | 52-64 | OPERATOR SET POINT PER HARVESTING PRACTICE | 12-25 | 600-1000 | <10 | OPERATOR SET POINT/MANUALLY MONITOR |
| 34,920-37,380 | 64-76 | OPERATOR SET POINT PER HARVESTING PRACTICE | 12-25 | 600-1000 | <10 | OPERATOR SET POINT/MANUALLY MONITOR |
| 37,380-39,840 | 76-88 | OPERATOR SET POINT PER HARVESTING PRACTICE | 12-25 | 600-1000 | <10 | OPERATOR SET POINT/MANUALLY MONITOR |
| 39,840-42,300 | 88-100 | OPERATOR SET POINT PER HARVESTING PRACTICE | 12-25 | 600-1000 | <10 | OPERATOR SET POINT/MANUALLY MONITOR |
| 42,300- | 100- | OPERATOR SET POINT PER HARVESTING PRACTICE | 12-25 | 600-1000 | <10 | OPERATOR SET POINT/MANUALLY MONITOR |

Table 1 illustrates an example of the content of a lookup table accessed by the controller 102 to determine a correction factor which is used to adjust the blade angle of incidence based on airflow, power consumption, and machine feed rate. The values in Table 1 provide examples for a particular type of fan blade having a predetermined blade pitch. Consequently, the values in Table 1 can change based on the type of fan blade being used. In this embodiment, the fan blade is single profile airfoil, and more specifically a GOE 417A. Other types of blades are contemplated and the use of such blades can alter the values in the chart of Table 1.

Once the angle of incidence is identified, the controller 102 identifies from a lookup table a correction factor at block 212 needed to change a current blade angle of incidence to the identified blade angle of incidence is based on the lookup table values. The correction factor includes a correction factor for blade angle of incidence and an airflow correction factor based on maximum pressure and maximum angle of incidence. In different embodiments, the correction factor includes a fan loading factor based on angle of incidence of the fan blade and fan loading. For instances, if the fan blade is set to the correct angle of incidence to achieve a desired cleaning level, but the fan loading is too high, then the control adjusts the angle of incidence of the blade to bring the motor operation within a desired operating limit. In one embodiment, a motor operating range provided by a motor manufacturer is used as a basis of the correction factor. After identification of the correction factor, the blade angle of incidence is adjusted and the sugarcane is harvested at the adjusted blade angle of incidence at block 215.

If blade angle of incidence and fan rpm determined by the program are correct based on calculations of the processor, but are over the power consumption limit set by the operator, the blade pitch or fan speed will be adjusted. There are two fan loading/power consumption limits to take into consideration as follows: 1) blade max operating condition at max of angle of attack or above. At this operating condition, airflow separates from the blades, causing extreme air turbulence and fan power consumption and eventually fan stalling; and 2) fan motor/hydraulic circuit pressure-speed and blade pitch limits will be put in place depending on the motor circuit type and circuit pressure rating.

If, however, the operator selects both the automatic clean limits and a power consumption range at block 206, the controller 102 begins a startup operation that determines a baseline load on the motor 76 with the motor load sensor 110 when the harvester 20 is running and no crop is being cut, and a current load when crop is being cut. These values are used in the automatic cleaning process disclosed in the U.S. Pat. No. 10,091,934. Once the fan load and the airflow are identified at block 214, the controller 102 receives a cleaning feedback signal from the chamber cleaning sensor 114 to determine leaf content and billet losses in the sugarcane mat at block 216. Based on this cleaning feedback signal, the fan speed is changed according to the fan speed determined by the automatic cleaning adjustment at block 218. In block 218, the blade angle of incidence and fan speed are adjusted to match fan airflow and fan loading, i.e. power consumption. The angle of incidence and fan speed (fan rpm) are adjusted based on the auto clean limits and power consumption requirements. In one embodiment, the value of blade angle of incidence based on airflow and fan power consumption range is identified in a lookup table stored in memory 106. In other embodiments, the lookup table is supported by or replaced by software instructions configured to calculate the value of blade angle of incidence. In one embodiment, the value of blade angle of incidence is continuously updated and applied to the fan. In one embodiment, the lookup table provides recommended or predetermined airflow and power consumption ranges for a specific amount of sugarcane being harvested, also identified as a specific tonnage.

As described herein, in one embodiment, the blade angle of incidence is adjusted based on the airflow and power consumption. In another embodiment using the auto clean limits of block 206 of FIG. 4, the auto clean process reduces fan speed when losses are too high. While fan speed and airflow are not interchangeable, they are related, Airflow=Air Velocity×Outlet Area. Fan RPM will determine air speed, i.e. fan velocity.

In a hydraulic system, where the motor 270 is a hydraulic motor, the motor pressure and hydraulic pressure are the same. Fan loading is directly related to sugarcane tonnage and the fan speed or fan RPM. For instance, in one example the operator or other individual determines or knows the tonnage of billets, which may be approximate, that is present in the field being harvested. Based on that tonnage, the operator, in one example, would select a hydraulic pressure of the motor to operate the motor at 10 horsepower and an air flow of 30,000 cfm. Fan horsepower is based on several factors of the cleaning system, and is not the same for all harvesting systems. Consequently, each different harvesting system operates under limits that may differ from those seen in Table 1. The processor 102 based on these selected values sets the motor rpm at 800 rpm and the blade pitch at 12 degrees. As the harvester moves through the field, and enters a fertile location, the motor hydraulic pressure rises to a point which is greater than the selected hydraulic pressure, which increases the load on the harvester engine which in turn increases fuel consumption. Since the hydraulic pressure is too high, the controller 102 adjusts the angle of incidence of the fan blades to achieve the selected motor hydraulic pressure and selected airflow. If the next patch of sugarcane includes a reduced amount of sugarcane, the controller 102 identifies that the power consumption of the motor, i.e. hydraulic pressure, has been reduced and in response the controller 102 adjusts the angle of incidence of the blade. The controller 102, therefore adjusts blade angle of incidence in response to power consumption and airflow selections to arrive at an optimized power consumption.

Once the fan speed has been changed, correction factors are determined at block 220 which include hydraulic motor pressure, fan speed, fan loading and billet throughput. These correction factors are used at block 216 to determine how the correction factors are used in the self-cleaning feedback at block 216.

Figure 5:
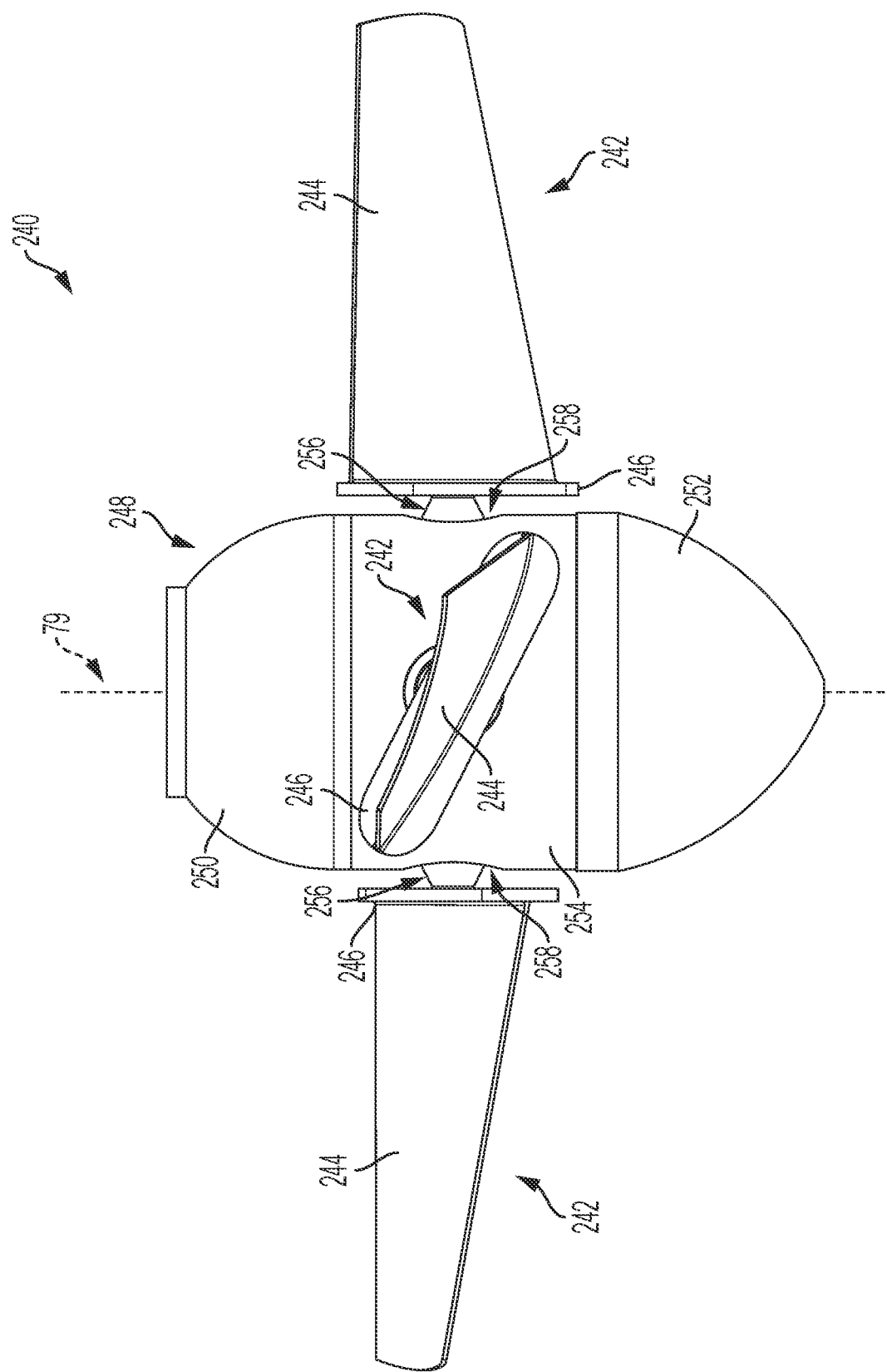
FIG. 5 illustrates an embodiment of a fan assembly.
Figure 6:
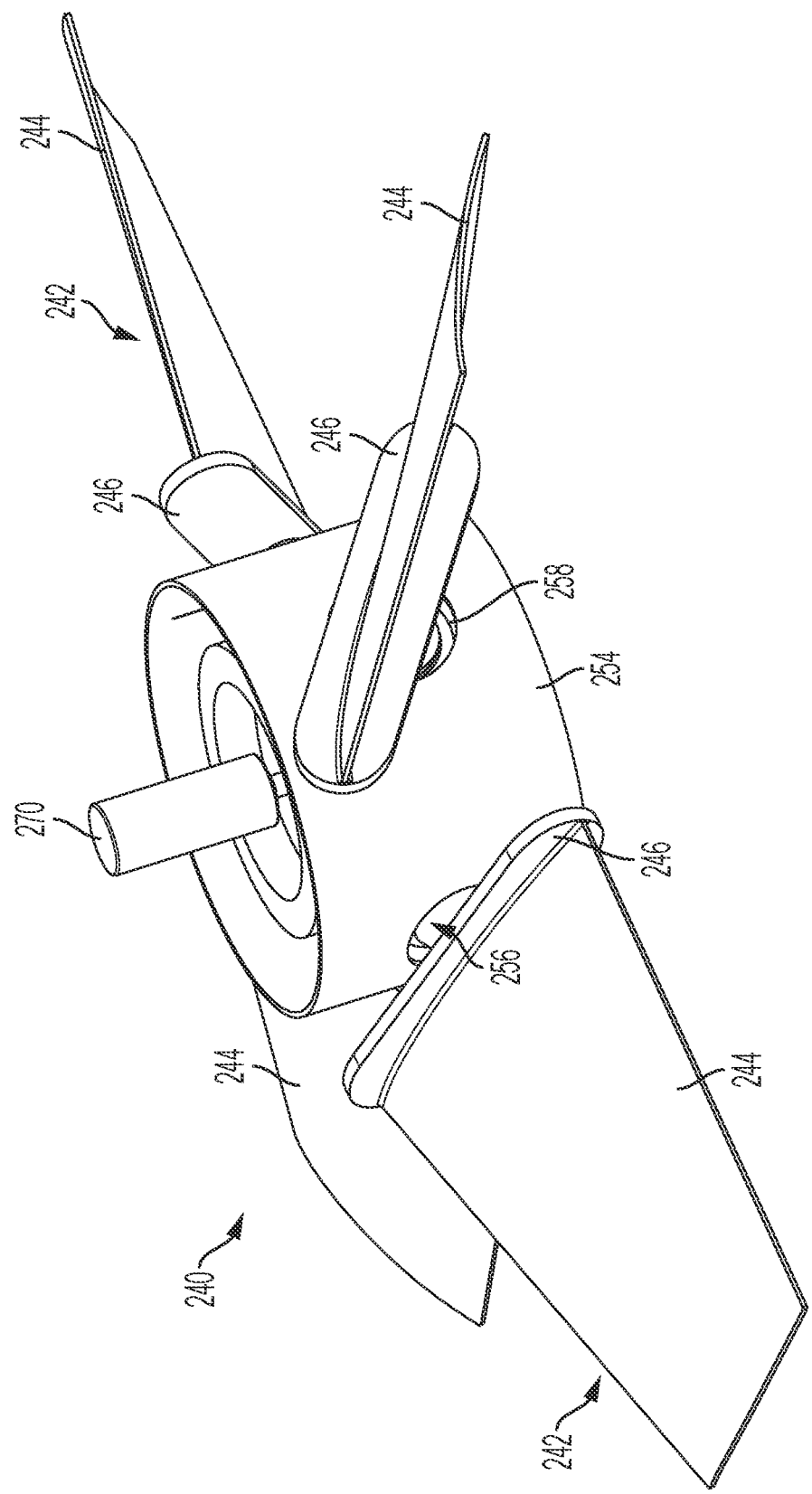
FIG. 6 illustrates a portion of the fan assembly of FIG. 5.

FIG. 5 illustrates another embodiment of a fan assembly 240 having four angle of incidence adjustable fan blade assemblies 242, three blade assemblies of which are shown. Each of blade assemblies 242 includes a fan blade 244 fixedly connected to and extending from a flange 246. Each of the fan blade assemblies extends from a housing 248 having a top portion 250, a bottom portion 252, and a middle portion 254. Each of the fan blade assemblies 242 includes a spindle 256 fixedly coupled to flange 246 and each of which extends through an aperture 258. See also FIG. 6. Other numbers of fan blade assemblies are contemplated.

Figure 7:
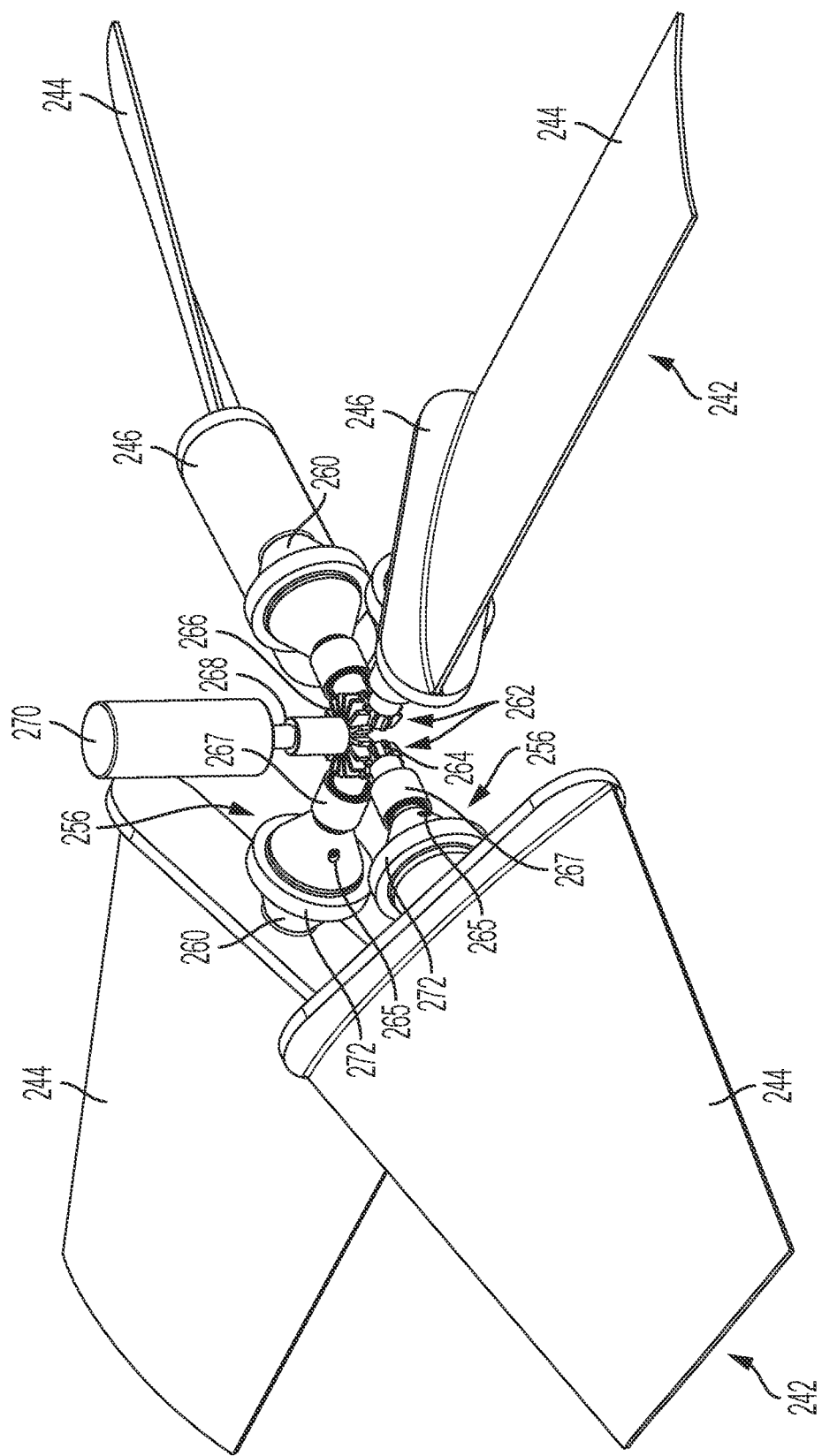
FIG. 7 illustrates a motor operatively connected to blade assemblies of a fan assembly.

As further seen in FIG. 7, each of the spindles 256 includes a first end 260 fixedly connected to the flange 246 and a second end 262 having a gear 264 with teeth. The second end 262, and the attached gear 264, in one embodiment, are an insert that is separate from the blade 244. A set screw 265 fastens the second end 262 and gear 264 to the blade 244. Each of the blade assemblies 242 include a radial bearing 267 that rotationally supports the fan blade 244. Each of the gears 264 engages a single gear 266 coupled to a shaft 268 driven by a motor 270. The motor 270 is configured to drive the shaft 268 for adjusting the position of the gear 266 with respect to the shaft 268 such that the angle of incidence of each of the blades 244 is controlled by the gear 266. In one embodiment, each of the blades 244 includes a cone shaped flange 272 that, in one embodiment, is a part of the blade 244. In this embodiment, the cone shaped flange 272 is a unitary casted flange blade with a built in housing to attach a bevel gear insert, i.e. the second end 262 and gear 264. The middle portion 254 is a fan hub, where the fan blade assemblies 242 are mounted, to which a fan motor is coupled. The middle portion 254, consequently, rotates with rotation of the fan blades about the same shaft 268. The spindles 256 and the cone shaped flange 272 are rotatable in response to the single gear 266 being adjusted by the motor 270.

The angle of incidence of the blades 244 is adjusted in one or more of the following configurations. In one embodiment, a single motor or actuator is located at each blade. In another embodiment, a single motor drives all of the blades at the same time wherein one shaft per blade is tied to a universal joint. In another embodiment, the motor that adjusts the angle of incidence is. controlled by a wireless controller. This motor, in different embodiments, is battery powered or controlled by Bluetooth technology.

The cone shaped flanges 272 rotatably engage the middle portion 254 at the apertures 256 and are held in place at the middle portion to stabilize rotation of the blades when adjusted for angle of incidence. Once the blades are adjusted for angle of incidence, the blades are held in the adjusted position until changed based on a desired throughput. The middle portion 254 includes structures, not shown, to provide for a rotating interface between the middle portion 254 and the cone shaped flanges 272. Structures not shown include radial bearings that support the blades as the blade angle is adjusted by the motor 270.

The motor 270 is operatively connected to the controller 102 of FIG. 2. The controller 102 is configured to adjust the angle of incidence of the blades 244 through position of the gear 266 and to rotate the blades using the motor 270 to drive the shaft 268. The angle of incidence of each of the blades 244 is based on the values stored in the lookup table having values such as that shown in Table 1 as described above or determined by the processor 104.

Figure 8:
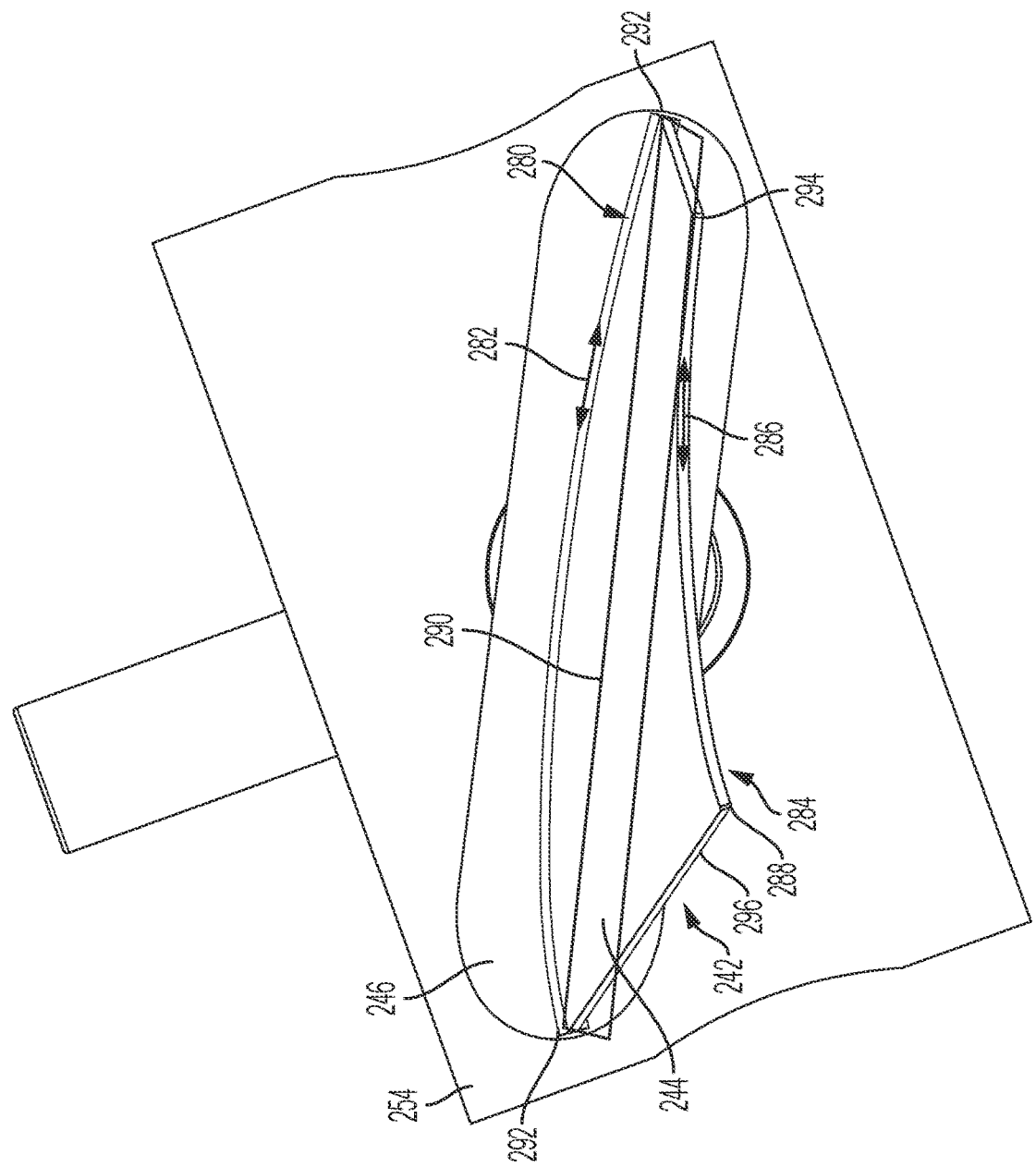
FIG. 8. illustrates an end view of a blade assembly including a blade coupled to a flange.

FIG. 8. illustrates an end view of the blade assembly 242 including one of the blades 244 coupled to the respective flange 246. In at least one embodiment, the blades 244 are airfoil type blades or variable pitch blades, such as variable thickness or single thickness blades. Other types of blades are contemplated including variable radius blades and constant radius blades, including constant radius sheet metal blades. In this figure, the middle portion 254 is shown in an angled position with respect to horizontal to show a curvature of the blade 244. This blade is an airfoil type blade know to those having ordinary skill in the art. The blade 244 includes a rear end 280 defining a curve having a first radius 282. The blade further includes a front edge 284 defining a curve having a second radius 286. In the illustrated embodiment, the first radius 282 and the second radius 284 have the same length. The font edge 284, however, is twisted with respect to the rear end 280, such that a corner 288 of the front edge 284 is offset at a greater distance from a plane 290 than a corner 294. The plane is defined by rear corners 292 and extends towards the front edge 284. The corner 288 is located along a leading edge 296 of the blade, wherein the leading edge 296 leads into the path of rotation defined by the motor 270.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A crop separator configured to process sugarcane, the crop separator comprising:

a housing including an inlet and an outlet, the inlet configured to receive a sugarcane mat, having crop debris and billets, and the outlet configured to discharge crop debris;

an air flow sensor located in the housing, the air flow sensor to determine an air flow speed through the housing, wherein the air flow sensor provides an airflow speed based on air velocity and an outlet area of the housing;

a fan assembly located in the housing, wherein the fan assembly includes a plurality of fan blades coupled to a spindle, a motor configured to rotate the plurality of fan blades about a rotational axis of the spindle, a motor load sensor, and a blade angle of incidence mechanism operatively connected to the plurality of blades, wherein the blade angle of incidence mechanism adjusts the angle of incidence of each of the plurality of blades; and a controller operatively connected to the motor and to the blade angle of incidence mechanism, the controller including a processor and a memory, wherein the memory is configured to store program instructions and the processor is configured to execute the stored program instructions to:

identify the air flow speed and the motor load;

identify an angle of incidence of one or more of the plurality of blades; and adjust the angle of incidence of the one or more of the plurality of blades based on the identified air flow speed and the motor load.

2. The crop separator of claim 1 wherein the processor is configured to execute the stored program instructions to: adjust the rotational speed of the motor.

3. The crop separator of claim 2 wherein the processor is configured to execute the stored program instructions to: adjust the angle of incidence of one or more of the plurality of blades based on the adjusted rotational speed of the motor.

4. The crop separator of claim 3 further comprising a user interface including a user selectable air flow speed selector.

5. The crop separator of claim 4 wherein the crop harvester includes a sensor to monitor a motor load of the motor.

6. The crop separator of claim 5 wherein the processor is configured to execute the stored program instructions to: adjust the angle of incidence of one or more of the plurality of blades based on the sensed motor load.

7. The crop separator of claim 6 further comprising an airflow sensor located between the inlet and the outlet of the housing, wherein the airflow sensor measures airflow through the housing.

8. The crop separator of claim 7 wherein the processor is configured to execute the stored program instructions to: adjust the angle of incidence of one or more of the plurality of blades based on the measured airflow.

9. The crop separator of claim 1 wherein the user interface includes a user selectable auto clean selector to automatically adjust fan speed based on a cleanliness of billets.

10. The crop separator of claim 9 wherein the processor is configured to execute the stored program instructions to: adjust the angle of incidence of one or more of the plurality of blades based on the automatically adjusted fan speed and a power consumption range.

11. A sugarcane harvester for harvesting sugarcane, the harvester comprising:

a cutter configured to cut sugarcane into a sugarcane mat having crop debris and billets;

an extractor operatively connected to the cutter, the extractor including a fan housing having an the inlet configured to receive the sugarcane mat and the outlet configured to discharge crop debris from the sugarcane mat, and a fan located in the fan housing to move the sugarcane mat through the fan housing, the fan including a motor, blades rotatably coupled to the motor, and a blade angle of incidence mechanism operatively connected to the blades, wherein the blade angle of incidence mechanism adjusts the angle of incidence of the blades with respect to the motor;

an elevator operatively connected to the extractor to discharge billets from the extractor;

an air flow sensor located in the fan housing, the air flow sensor to determine an air flow speed through the fan housing, wherein the air flow sensor provides the air flow speed based on air velocity and an outlet area;

a motor load sensor operatively connected to the fan to determine a load placed on the motor during movement of the sugarcane mat through the fan housing;

a user interface having user selectable controls, wherein the user interface includes air flow speed sensor selector; and a controller operatively connected to the user interface, the motor, and to the blade angle of incidence mechanism, the controller including a processor and a memory, wherein the memory is configured to store program instructions and the processor is configured to execute the stored program instructions to:

identify an air flow speed based on an input from the air flow sensor;

identify an angle of incidence of one or more of the blades; and adjust the angle of incidence of the one or more of the blades based on the identified air flow speed.

12. The sugarcane harvester of claim 11 wherein the processor is configured to execute the stored program instructions to: adjust the rotational speed of the motor in response the air flow speed.

13. The sugarcane harvester of claim 12 wherein the processor is configured to execute the stored program instructions to: adjust the angle of incidence of one or more of the blades based on the adjusted rotational speed of the motor.

14. The sugarcane harvester of claim 13 wherein the air flow sensor is located between the inlet and the outlet of the fan housing, wherein the air flow sensor measures the air flow speed of the sugarcane mat through the housing.

15. The sugarcane harvester of claim 14 wherein the processor is configured to execute the stored program instructions to: adjust the angle of incidence of one or more of blades based on the measured air flow speed and a motor load provided by the motor load sensor.

16. A method of harvesting sugarcane from a field of sugarcane with a sugarcane harvester, the method comprising:

cutting sugarcane from the field to obtain a sugarcane mat of cut stalk and crop residue;

delivering the cut stalk and the crop residue to a fan housing of the sugarcane harvester, the fan housing supporting an adjustable speed fan having blades;

providing an air flow through the fan housing with the adjustable speed fan to remove the crop residue from the sugarcane mat;

determining the air flow speed through the fan housing, wherein the air flow speed is based on air velocity and an outlet area of the fan housing;

adjusting an angle of incidence of the blades based on the determined air flow speed.

17. The method of claim 16 further comprising identifying a load of the adjustable speed fan while providing the air flow to remove the crop residue from the sugarcane mat.

18. The method of claim 17 further comprising adjusting the angle of in incidence of the blades based on the identified load.

19. The method of claim 18 further comprising measuring crop residue or billet loss from the sugarcane mat.

20. The method of claim 19 further comprising adjusting the angle of incidence of the blades based on the measured crop residue or billet loss from the sugarcane mat.

\* \* \* \* \*